US012570877B2

(12) United States Patent
Bilbrey

(10) Patent No.: US 12,570,877 B2
(45) Date of Patent: Mar. 10, 2026

(54) FILM INCLUDING HYBRID SOLVENT BARRIER AND PRIMER LAYER

(71) Applicant: 3M INNOVATIVE PROPERTIES COMPANY, St. Paul, MN (US)

(72) Inventor: David B. Bilbrey, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 355 days.

(21) Appl. No.: 17/635,918

(22) PCT Filed: Aug. 19, 2020

(86) PCT No.: PCT/IB2020/057795
§ 371 (c)(1),
(2) Date: Feb. 16, 2022

(87) PCT Pub. No.: WO2021/033146
PCT Pub. Date: Feb. 25, 2021

(65) Prior Publication Data
US 2022/0340789 A1      Oct. 27, 2022

Related U.S. Application Data

(60) Provisional application No. 62/889,427, filed on Aug. 20, 2019.

(51) Int. Cl.
*C09J 7/50* (2018.01)
*B32B 25/08* (2006.01)
(Continued)

(52) U.S. Cl.
CPC ................. *C09J 7/50* (2018.01); *B32B 25/08* (2013.01); *B32B 27/20* (2013.01); *B32B 27/306* (2013.01);
(Continued)

(58) Field of Classification Search
None
See application file for complete search history.

(56) References Cited

U.S. PATENT DOCUMENTS

| | | | |
|---|---|---|---|
| 3,239,478 A | 3/1966 | Harlan, Jr. | |
| 3,377,303 A | 4/1968 | Peerman | |

(Continued)

FOREIGN PATENT DOCUMENTS

| | | | |
|---|---|---|---|
| EP | 0692374 | | 1/1996 |
| FR | 2477562 A1 | * | 9/2019 |

(Continued)

OTHER PUBLICATIONS

Frihart, "Specific Adhesion Model for Bonding Hot-Melt Polyamides to Vinyl", International Journal of Adhesion & Adhesives, 2004, vol. 24, pp. 415-422.

(Continued)

*Primary Examiner* — Tamra L. Dicus
(74) *Attorney, Agent, or Firm* — Jeffrey M. Olofson

(57) ABSTRACT

Conformable, stretchable, printable films are described. In particular, films that include a film substrate, a pressure sensitive adhesive, and a hybrid solvent barrier/primer layer including a blend of two copolyamides that are not miscible are described. Such hybrid solvent barrier and primer layers may be effective as both a solvent barrier and a primer layer.

17 Claims, 3 Drawing Sheets

(51) Int. Cl.

| | | |
|---|---|---|
| *B32B 27/20* | (2006.01) | |
| *B32B 27/30* | (2006.01) | |
| *B32B 27/34* | (2006.01) | |
| *B32B 27/40* | (2006.01) | |

(52) U.S. Cl.

CPC ........... *B32B 27/308* (2013.01); *B32B 27/34* (2013.01); *B32B 27/40* (2013.01); *B32B 2307/4026* (2013.01); *B32B 2307/732* (2013.01); *B32B 2307/75* (2013.01); *B32B 2451/00* (2013.01); *C09J 2477/003* (2013.01)

(56) References Cited

U.S. PATENT DOCUMENTS

| | | | |
|---|---|---|---|
| 3,935,338 | A | 1/1976 | Robertson |
| 4,181,752 | A | 1/1980 | Martens |
| 4,952,650 | A | 8/1990 | Young |
| 5,169,727 | A | 12/1992 | Boardman |
| 5,296,277 | A | 3/1994 | Wilson |
| 6,025,070 | A | 2/2000 | Heederik |
| 6,268,466 | B1 * | 7/2001 | MacQueen .............. A61K 8/31 528/335 |
| 2002/0192465 | A1 | 12/2002 | Liu |
| 2006/0269755 | A1 * | 11/2006 | Song ........................ B32B 3/26 428/480 |
| 2007/0137775 | A1 * | 6/2007 | Bargmann ................ C09J 7/35 156/244.11 |
| 2012/0208033 | A1 * | 8/2012 | Weigel .................... B32B 7/023 428/447 |
| 2014/0170341 | A1 * | 6/2014 | Katarya ............... B41M 5/5254 428/32.39 |
| 2015/0257381 | A1 * | 9/2015 | Ophir ....................... C09D 7/45 424/404 |
| 2015/0346621 | A1 * | 12/2015 | Breese ................ C08L 23/0869 524/514 |
| 2017/0355223 | A1 * | 12/2017 | Shibahara ................. B32B 7/06 |
| 2018/0043656 | A1 * | 2/2018 | Song ................... H01M 50/491 |
| 2018/0065105 | A1 * | 3/2018 | Song .................. B01D 69/1214 |
| 2021/0032405 | A1 * | 2/2021 | Noon ........................ B32B 7/12 |
| 2022/0119569 | A1 * | 4/2022 | Knopf ................... C08F 226/02 |
| 2022/0145090 | A1 * | 5/2022 | Zha ......................... G03G 7/008 |

FOREIGN PATENT DOCUMENTS

| | | | |
|---|---|---|---|
| JP | 2002-347188 | | 12/2002 |
| JP | 2019156970 A | * | 9/2019 |
| TW | 2012-44935 | | 11/2012 |
| TW | 2015-22036 | | 6/2015 |
| WO | 2014-037647 | | 3/2014 |
| WO | WO 2016-138967 | | 9/2016 |

OTHER PUBLICATIONS

International Search Report for PCT International Application No. PCT/IB2020/057795, mailed on Nov. 20, 2020, 3 pages.

* cited by examiner

300

310
322
324
326
330
340

FILM INCLUDING HYBRID SOLVENT BARRIER AND PRIMER LAYER

CROSS REFERENCE TO RELATED APPLICATIONS

This application is a national stage filing under 35 U.S.C. 371 of PCT/IB2020/057795, filed Aug. 19, 2020, which claims the benefit of U.S. Provisional Application No. 62/889,427, filed Aug. 20, 2019, the disclosure of which is incorporated by reference in its/their entirety herein.

BACKGROUND

Certain films are used for displaying graphics and other visual information once adhered on surfaces. These films may be created in part by printing inks on an ink-receptive surface of such a film. As inks commonly are solvent-borne, some of these solvents may permeate through the thickness of the film and into the adhesive layer, creating undesirable tackiness and poor removability. Certain pressure sensitive adhesives may adhere poorly to the film substrate, making the film prone to delamination without an intermediate layer having adequate adhesion to each of the adhesive and the substrate.

SUMMARY

In one aspect, the present description relates to a conformable, stretchable, printable film. The film includes a film substrate having a first major surface for receiving ink, a pressure sensitive adhesive, and a hybrid solvent barrier/ primer layer. The hybrid solvent barrier/primer layer is disposed between and bonds to both the film substrate and the pressure sensitive adhesive, and is disposed on the opposite side of the film substrate from the first major surface. The hybrid solvent barrier/primer layer includes two copolyamides that are not miscible, and hybrid solvent barrier/primer layer includes one copolyamide is in a continuous and one copolyamide is in a discontinuous phase.

In another aspect, the present description relates to a method of providing a conformable, stretchable ink receptive film with a hybrid solvent barrier/primer layer. The method includes providing a film substrate, coating a blend of a two non-miscible copolyamides on a major surface of the film substrate to form a hybrid solvent barrier/primer layer where one copolyamide is in a continuous phase and one copolyamide is in a discontinuous phase, and applying a pressure sensitive adhesive layer over the hybrid solvent barrier/primer layer.

In yet another aspect, the present description relates to a conformable, stretchable, printable film. The film includes a film substrate having a first major surface for receiving ink, a pressure sensitive adhesive, and a hybrid solvent barrier/ primer stack. The hybrid solvent barrier/primer stack is disposed between and bonds to both the film substrate and the pressure sensitive adhesive, and is disposed on the opposite side of the film substrate from the first major surface. The hybrid solvent barrier/primer stack includes two layers, where each of the layers in the hybrid solvent barrier/primer layer includes two copolyamides that are not miscible. Each of the layers in the hybrid solvent barrier/ primer layer includes a different blend of the same two copolyamides.

DETAILED DESCRIPTION

Figure 1:
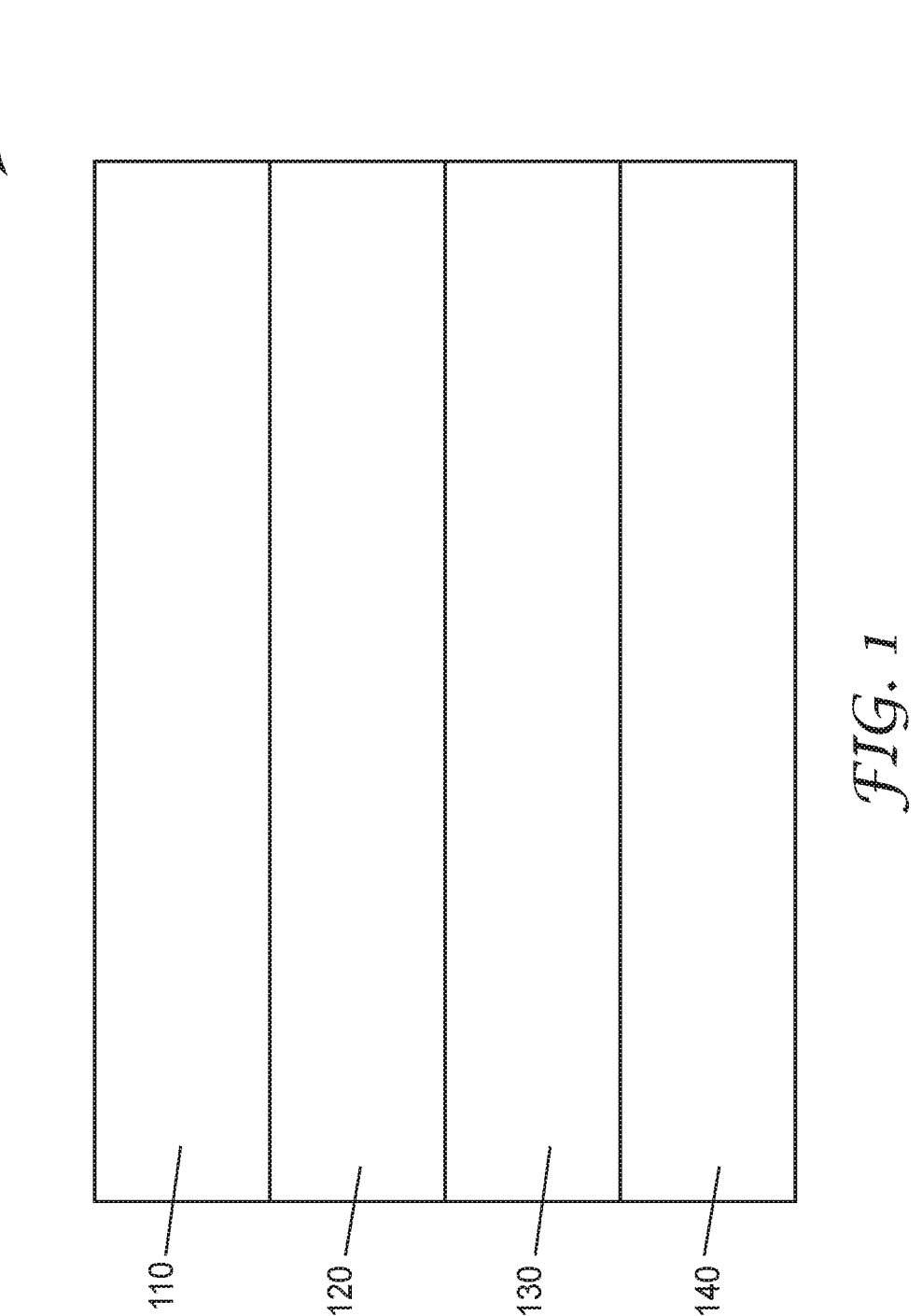
FIG. 1 is a side elevation schematic cross-section of an embodiment of a film including a hybrid solvent barrier and primer layer.

Graphics films, including large format graphics for use in displaying information on vehicles, walls, and signs, are typically provided as an adhesive film, for easy temporary, semi-permanent, or permanent (whether or not removeable) positioning on a substrate. Such films may be uncolored (clear), may be white, or may be any other suitable color. In many cases, the films may be designed to be printable (i.e., may be inherently ink-receptive or may include an ink-receptive coating) so that an image or other information can be transferred onto the film. For example, a brand owner might want to provide an advertisement, logo, or other information on a film to be adhered to a truck or van.

Inks are usually applied by printing. Large format printing is widely available utilizing solvent-borne inks. Latex inks that are water-based exist but are not as commonly used. While inks are typically only applied to the top surface of such a film, solvent used in the most common ink systems permeates through the layers and eventually migrates to the adhesive layer. Solvent migration into the adhesive layer can alter the otherwise carefully tuned properties of the adhesive layer, possibly making application and removability difficult. In some applications, contaminant migration the other way (i.e., from the adhesive into the ink-receptive substrate) may also be an issue.

To address this issue, certain films feature a multi-layer system. One of the layers is designed to act as a solvent barrier, and one or more layers are used to allow the solvent barrier layer to adhere to the rest of the layers of the film, referred to as a primer or prime layer. Depending on the substrate and the adhesive system used, films may have used a primer layer on both sides of the solvent barrier layer.

Combining the properties of a primer layer and a solvent barrier layer is not as simple as blending two polymers with these properties. Co-processability (for example, the ability to be coextruded or dissolved in a common solvent) may be necessary for manufacturing at a commercial scale. Additionally, barrier properties are typically only effective if solvent cannot readily penetrate through any point in the layer. If a blend allows for a path for solvent to travel through the layer, it may be ineffective as a barrier. Additionally, the proportion of the blend that may be required to create an effective solvent barrier may become ineffective as a primer layer. Finally, not all blends that may be both effective solvent barriers and primer layers are suitable for a stretchable and conformable film system, and may crack, delaminate, or be otherwise brittle when handled and applied.

Surprisingly, using two copolyamides that are not miscible in the hybrid solvent barrier/primer layer, wherein one copolyamide is a continuous phase and one copolyamide is a discontinuous phase can provide both effective barrier performance and effective primer performance. In some embodiments, one of the copolyamides includes a tertiary amide functional group and one of the copolyamides does not have a tertiary amide functional group. In some embodiments, the copolyamide with a tertiary amide functional group is the copolyamide in the discontinuous phase. In these embodiments, a copolyamide without a tertiary amide functional group is the continuous phase.

FIG. 1 is a side elevation schematic cross-section of an embodiment of a film including a hybrid solvent barrier and primer layer. Film 100 includes film substrate 110, hybrid solvent barrier and primer layer 120, adhesive layer 130 and, optionally, liner 140.

Substrate 110 may be any suitable substrate and may be any desired shape or size. Substrate 110 may be formed as a cast, calendared or extruded film substrate. In some embodiments, substrate 110 may be or include polyvinyl chloride (PVC). PVC is commonly used for graphics films exposed to the elements because of its good weatherability and outdoor durability. In some embodiments, substrate 110 may be or include other polymers or polymer blends, such as polyurethanes (including thermoplastic polyurethanes), cellulose acetate butyrate, polyamides, polyolefins, polystyrenes, polycarbonate s, polyacrylates, polyvinyl alcohol, polyvinyl butyral, and fluoropolymers. Substrate 110 may be any suitable thickness and may practically depend on the method by which it is manufactured. For example, the substrate may have a thickness of 10 μm, 15 μm, 20 μm, 25 μm, 30 μm, 40 μm, 50 μm, 60 μm, 70 μm, 80 μm, 90 μm, 100 μm, 125 μm, 150 μm, 175 μm, or 200 μm, or in a range between any two of the values previously listed. Substrate 110 may include a pigment or other colorant. In some embodiments, substrate 110 may include carbon black or titanium dioxide (white), although any pigment system may be selected for the desired application. In some embodiments, substrate 110 may be a primed layer or include a primer layer or other treatment to increase interlayer adhesion.

Hybrid solvent barrier/primer layer 120 is formed of any suitable material and may be any suitable thickness. In some embodiments, the hybrid solvent barrier/primer layer may be less than 10 μm, may be less than 8 μm, may be less than 6 μm, may be less than 4 μm, may be less than 3 may be less than 2 μm, may be less than 1 μm, or even may be less than 0.5 μm. In some embodiments, the thinness of hybrid solvent barrier/primer layer is limited in thickness only by the minimum thickness required to provide the desired barrier performance. In some embodiments, if the hybrid solvent barrier/primer layer is extruded, there may be a higher practical thickness due to the need to maintain integrity of the web.

In some embodiments, hybrid solvent barrier/primer layer 120 includes a blend of two copolyamides. In some embodiments, hybrid solvent barrier/prier layer 120 includes one copolyamide including a secondary amide functional group. In some embodiments, hybrid solvent barrier/primer layer 120 includes one copolyamide including a tertiary amide functional group and includes one copolyamide not including a tertiary amide functional group. In some embodiments, hybrid solvent barrier/primer layer 120 includes no more than 50 wt % of the copolyamide with a tertiary amide functional group between the two copolyamides. In some embodiments, hybrid solvent barrier/primer layer 120 includes no more than 40 wt % of the copolyamide with a tertiary amide functional group between the two copolyamides. In some embodiments, the two copolyamides dissolve in a common solvent. In some embodiments, the two copolyamides dissolve in a mixture of n-propanol and water. In some embodiments, the two copolyamides are coextrudable.

Suitable copolyamides without tertiary amide functional groups include ELVAMIDE 8063 (available from DuPont; Wilmington, Del.) and ULTRAMID 1C (available from BASF, Wyandotte, Mich.). Such copolyamides have poor bonding capability, but exhibit excellent solvent barrier performance.

A tertiary amide functional group may enable effective bonding to pressure sensitive adhesives and polyvinyl chloride substrates. For example, copolyamides formed at least in part with monomers such as piperazine or dipiperazine will exhibit good adhesion to PVC substrates. Suitable copolyamides with tertiary amide functional groups include PLATAMID M1276 and PLATAMID HX2592T (available from Arkema N A; King of Prussia, Pa.). These copolyamides exhibit good bonding, while provide little solvent barrier performance.

In some embodiments, the copolyamides are phase separated. In some embodiments, one copolyamide forms a continuous phase and one copolyamide forms a discrete or discontinuous phase. In such a phase separated system—despite including a polyamide that does not effectively prevent solvent migration—with the copolyamide exhibiting good barrier performance forming the continuous phase, the hybrid solvent barrier/primer layer is still effective, even at small thicknesses.

In some embodiments, the hybrid solvent barrier and primer layer is pigmented or includes colorants. In some embodiments, the hybrid solvent barrier and primer layer may include carbon black. Pigmenting the hybrid solvent barrier and primer layer may help with the perceived opacity of a final printed film.

Adhesive layer 130 can be made from or may include a variety of adhesives, including pressure sensitive adhesives. Suitable adhesives may be selected by the skilled artisan, and are often selected based upon the type of substrate they are to be adhered to. Classes of pressure sensitive adhesives include acrylics, tackified rubbers, tackified synthetic rubbers, ethylene vinyl acetates, silicones, and the like. Suitable acrylic adhesives are disclosed, for example, in U.S. Pat. Nos. 3,239,478, 3,935,338, 4,952,650, 4,181,752, and 5,169,727.

A particular class of pressure sensitive adhesives that may be useful in this particular application are the reaction product of at least one alkyl acrylate with at least one reinforcing comonomer. Suitable alkyl acrylates are those having a homopolymer glass transition temperature below about −10° C., and include, for example, n-butyl acrylate, 2-ethylhexyl acrylate, isooctyl acrylate, isononlyl acrylate, octadecyl acrylate and the like. Suitable reinforcing monomers are those having a homopolymer glass transition temperature about −10° C., and include for example, acrylic acid, methylidenesuccinic acid, isobornyl acrylate, N,N-dimethylacrylamide, N-vinyl caprolactam, N-vinyl pyrrolidone, and the like.

The thickness of adhesive layer 130 may be selected for the particular application based upon several factors, including for example, the adhesive composition, whether the adhesive includes microstructured surfaces, the type of substrate, and the thickness of the film. Those skilled in the art are capable of adjusting the thickness to address specific application factors based on the disclosure herein. Adhesive layer 130 may be coated onto a liner and applied to the rest of film 100 or may be coated directly onto or coextruded with the rest of film 100.

Liner 140 is optional in the construction, and typically is a paper or polymeric liner with a coating to provide easy removal from the adhesive layer. In some instances, liner 140 may have a very even, smooth or glossy surface. In other instances, the liner may have surface texture created by a method such as embossing or printing. In some embodiments, the liner includes a structured pattern, such as channels, ridges, or grooves. Such a structured pattern may impart an inverse structure onto the adhesive layer. This pattern may be helpful in applying the adhesive to a surface, providing, for example, easy air release upon initial installation.

Figure 2:
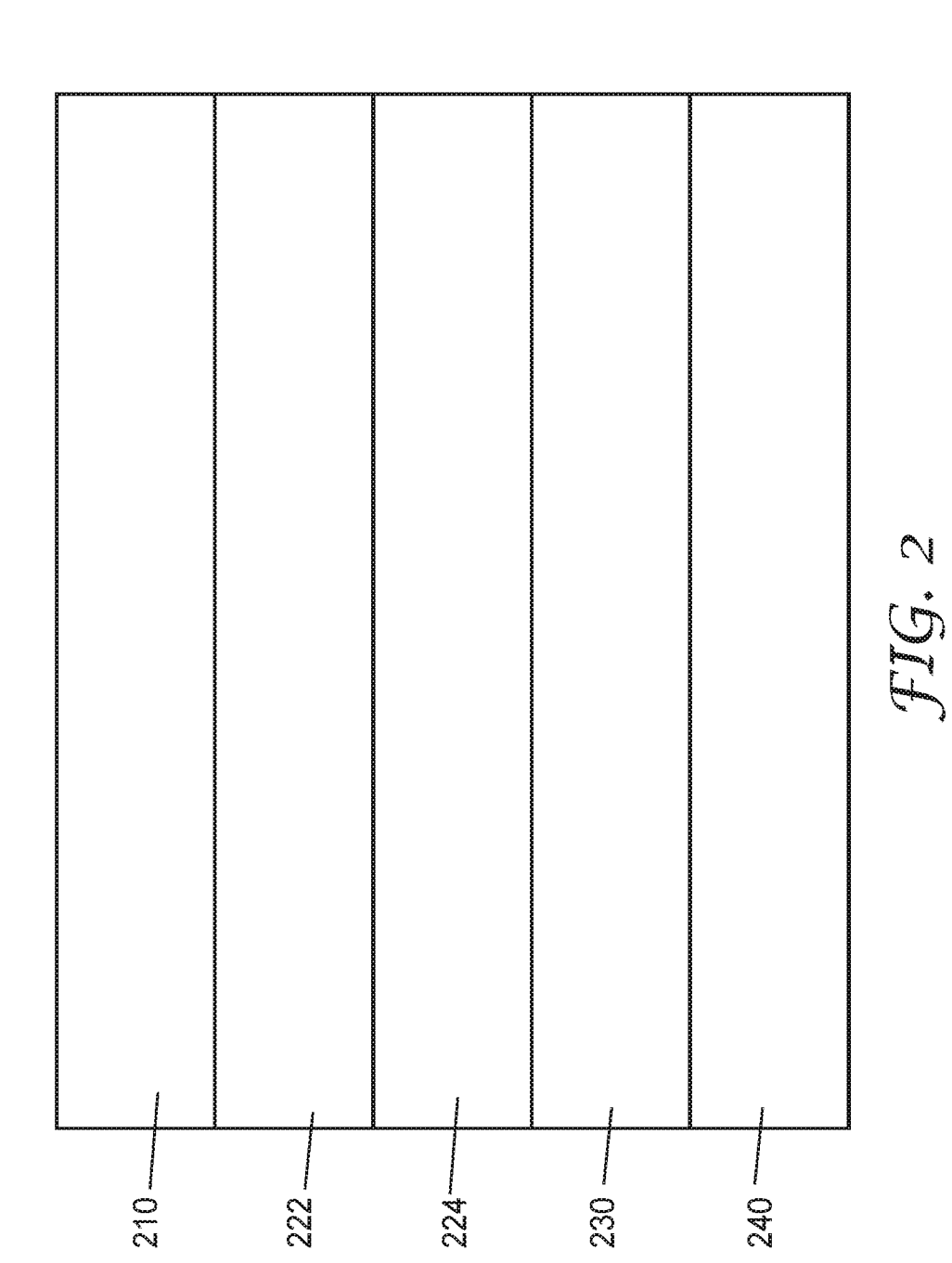
FIG. 2 is a side elevation schematic cross-section of another embodiment of a film including a two-layer hybrid solvent barrier and primer stack.

FIG. 2 is a side elevation schematic cross-section of another embodiment of a film including a two-layer hybrid solvent barrier and primer. Film 200 includes film substrate 210, first hybrid solvent barrier and primer layer 222, second hybrid solvent barrier and primer layer 224, adhesive layer 230, and, optionally, liner 240.

Film 200 is similar to film 100 in FIG. 1, except the hybrid solvent barrier/primer layer is a two-layer stack instead of a single layer. First hybrid solvent barrier and primer layer 222 and second hybrid solvent barrier and primer layer 224 each include a blend of two copolyamides. In some embodiments, the first and second hybrid solvent and primer layers each a different blend of the same two copolyamides. In some embodiments, the blend of two copolyamides may be phase separated. Because of the phase separation, a different blend of the same two copolyamides may have different performance. One blend may function as an effective barrier layer but have relatively poor bonding ability, while a slightly different blend may have moderate barrier performance but excellent bonding. Depending on the application and other layers in the film, these layers may be provided in any order. Having the same two copolyamides to achieve different effects may allow for simplified or more adaptable manufacturing processes. Blend percentages can be fine tuned and adjusted to achieve desired properties without requiring different components. In some embodiments, one layer includes great than 50 wt % of a copolyamide with a tertiary amide functional group, and one layer includes no more than 50 wt % of a copolyamide with a tertiary functional group.

In some embodiments, the first hybrid solvent barrier and primer layer 222 may have negligible barrier performance and functions chiefly as a primer layer in order to promote interlayer adhesion between substrate 210 and the second hybrid solvent barrier and primer layer 224. Such a layer would be disposed between and bonded to both substrate 210 and second hybrid solvent barrier and primer layer 224. In such embodiments, such a layer may be or include an aminoethylated acrylic polymer or crosslinked acrylic acrylate-amine copolymers. Examples of suitable aminoethylated acrylic polymers include POLYMENT (available from Nippon Shokubai, Osaka, Japan). Similarly to layers described herein such layers may include pigments or other colorants, including titanium dioxide (white) or carbon black.

Figure 3:
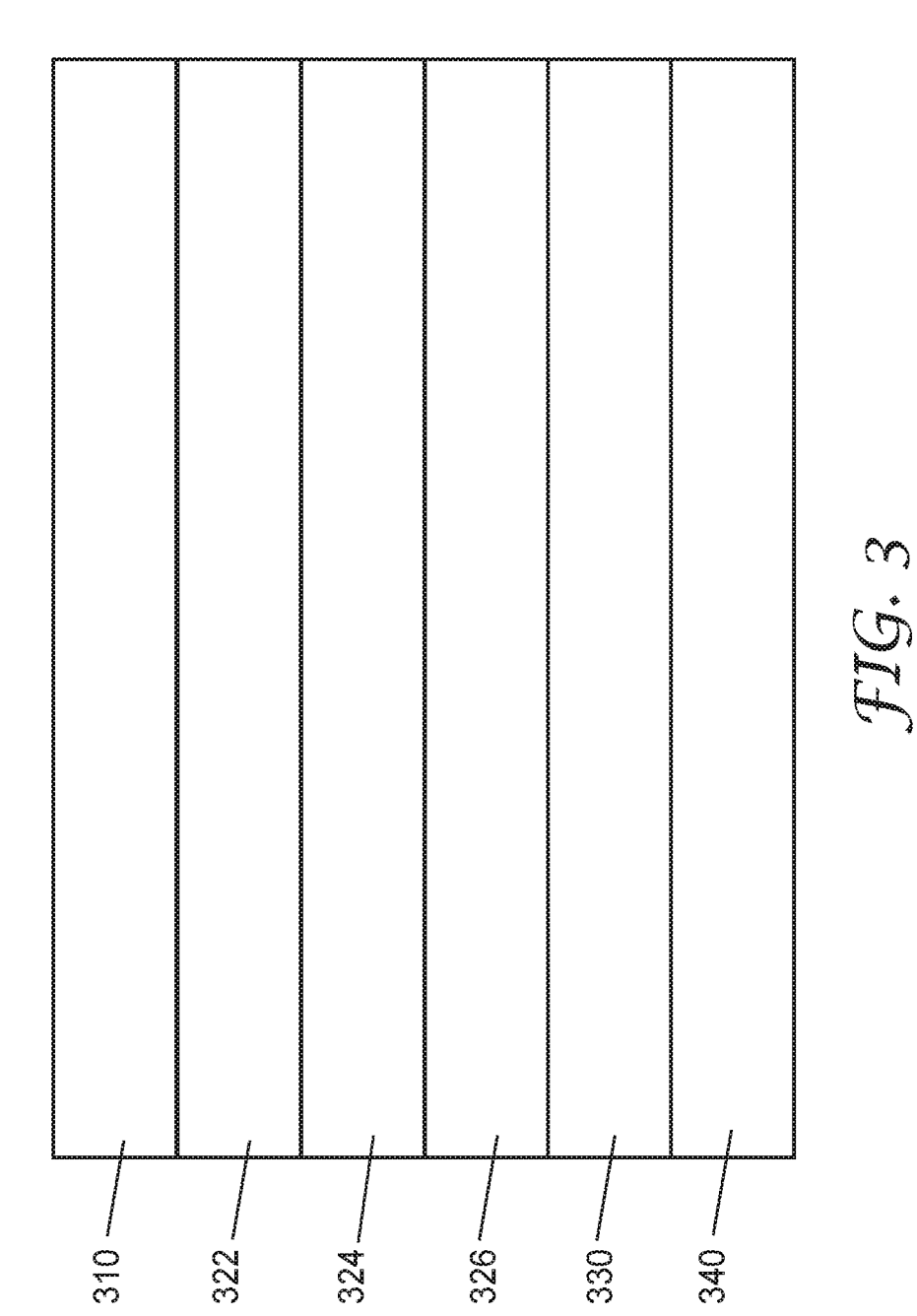
FIG. 3 is a side elevation schematic cross-section of another embodiment of a film including a three-layer hybrid solvent barrier and primer stack.

FIG. 3 is a side elevation schematic cross-section of another embodiment of a film including a three-layer hybrid solvent barrier and primer stack. Film 300 includes film substrate 310, first hybrid solvent barrier and primer layer 322, second hybrid solvent barrier and primer layer 324, third hybrid solvent barrier and primer layer 326, adhesive layer 330, and, optionally, liner 340.

Film 300 in FIG. 3 is similar to film 200 in FIG. 2 and film 100 in FIG. 1, except that hybrid solvent barrier/primer layer stack is three layers instead of two layers or instead of a single layer. Similar to film 200 in FIG. 2, the hybrid solver barrier and primer stack is made up of multiple layers. As in other hybrid solvent barrier and primer layer stacks and layers, each of the layers include a blend of two copolyamides. In some embodiments, each of the layers includes a different blend of the same two copolyamides. In some embodiments, each of the layers includes a blend of the same two copolyamides, with two of the blends being the same. Such a configuration may be useful in, for example, applications where the outer two layers of the three-layer stack (e.g., first hybrid solvent barrier and primer layer 322 and third hybrid solvent barrier and primer layer 326) are blended to have excellent primer bonding performance, for example, to one of more of film substrate 310 and adhesive layer 330. In some embodiments, two layers of the hybrid solvent barrier and primer stack include greater than 50 wt % of a copolyamide with a tertiary amide functional group, and one layer of the hybrid solvent barrier and primer stack includes no more than 50 wt % of a copolyamide with a tertiary amide functional group.

Factors that can influence the conformability of a film include the identity of the material used to make the film, the molecular weight of such material, the conditions to which such film is subjected (e.g., temperature, radiation exposure, and humidity), and the presence of additives in the film material (e.g., plasticizer content, reinforcing fibers, pigments, stabilizers (e.g., UV stabilizers), and hardness enhancing particles).

Films described here are also stretchable, meaning that they can be elongated to some percentage beyond its initial dimensions without breaking or plastically deforming. In some embodiments, films described herein are stretchable to 120%, 130%, 140%, 150% 160%, 170%, 180%, 190%, or even 200% or more of its original dimensions.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modifications and variations of the concepts herein disclosed may be resorted to by those of ordinary skill in the art, and that such modifications and variations are considered to be within the scope of embodiments of the present invention.

EXAMPLES

Copolyamide resin blends were made and coated on cast vinyl films and laminated to a pressure sensitive adhesive-coated release liner. Solvent barrier properties and adhesion properties were measured. These examples are merely for illustrative purposes only and are not meant to be limiting on the scope of the appended claims. All parts, percentages, ratios, etc. in the examples and the rest of the specification are by weight, unless noted otherwise. The following abbreviations are used herein: mil=one thousandth of an inch; m=meter; cm=centimeters; ° C.=degrees centigrade; min=minute; BCM=billion cubic micrometers.

TABLE 1

| Materials Used in the Examples. | |
| --- | --- |
| Abbreviation | Description and Source |
| PLATAMID HX 2592T | Arkema, NA; King of Prussia, PA United States, |
| PLATAMID M1276 | Arkema, NA; King of Prussia, PA United States |

TABLE 1-continued

| Materials Used in the Examples. | |
|---|---|
| Abbreviation | Description and Source |
| ULTRAMID 1C | BASF Corporation, Wyandotte, MI |
| ELVAMIDE 8063 | EI DuPont De Nemours and Company, Wilmington, DE |
| n-propanol | Nexeo Solutions, St. Louis, MO |
| ECO-SOL MAX2 ESL4-4BK | Roland DB Corporation, Irvine, CA |
| Hostajet Black O-PT | Clariant Corporation, Charlotte, NC |
| Alodine Q Panel | Q-Lab Corporation, Westlake, Ohio |
| 8518 Overlaminate | 3M Company; St. Paul, Minn. |

Examples (E1-E12) and Comparative Examples (CE1-CE9)

A cast vinyl substrate was formed by coating an organosol onto a paper casting liner similar to or as described in Sarvetnick H A (1972) 'Plastisols and Organosols' (Van Nostrand Reinhold Company: New York, N.Y.). Components included an organosol high molecular weight PVC resin homopolymer, polymeric adipic acid plasticizer, heat stabilizer, and titanium dioxide pigment. A silicone-coated microreplicated, embossed release liner similar to that described in U.S. Pat. No. 5,296,277 was coated with an acrylic acid-containing acrylic pressure sensitive adhesive.

Hybrid solvent barrier/primer coating solutions were prepared using resins dissolved in alcohol and water. Blends of two resins were prepared by adjusting the ratio of one relative to the other. Resins were dissolved in solution comprising 90 percent n-propanol and 10 percent deionized water.

Film substrates were cut into 1 inch×5 inch (2.5 cm×12.7 cm) sections and each coated using a notch bar. Resin solutions were drawn down using a notch bar set at a 3 mil (76 micrometer) gap between the bar and print film. Coated films were dried for about a minute in a hood then placed in a 40° C. oven for a minute. After conducting the Permeation—Gravimetric Cup Test as described below, the coated film substrate was laminated to the release liner-pressure sensitive adhesive stack and placed in a 65° C. oven for one minute to dry.

Test Methods

Permeation—Gravimetric Cup Test

Test was derived from the Society of Automotive Engineers (SAE) J2665 "Test Procedure to Measure the Fuel Permeability of Materials by the Cup Weight Loss Method." 2″ EZ-Cup Vapometer Permeability Cup was obtained from Thwing-Albert Instrument Company, West Berlin, N.J. Cups are aluminum and equipped with an aluminum threaded flanged ring. Barrier coated films to be tested are held in place using a polytetrafluoroethylene gasket, fine screen and coarse screen to keep films from bulging during testing. The test works by partially filling a cup with methyl ethyl ketone (MEK) then sealing the cup using a barrier coated film. The cup was placed in an oven at 40° C. and weight of the cup was taken over time. The permeation rate was obtained by calculating the slope of the % solvent weight loss versus time line and is a figure of merit for barrier performance. For reference, an uncoated vinyl film had a permeation rate of 2.66% solvent loss/hour. Results are shown in Table 2.

Bonding Between Hybrid Solvent Barrier/Primer Layer and Vinyl Film

Ply bond testing explores the bond between the hybrid solvent barrier/primer layer and vinyl film as a laboratory proxy for real world delaminations. This film construction was evaluated for ply performance by first laminating the film to 3M 8518 Overlaminate film, cutting each sample into three 1 inch by 5 inch (2.5 cm×12.7 cm) strips, and applying the adhesive side of the films to an Alodine Q panel then aging in a 66° C. oven for 2 hours. An Instron Universal Test Machine (Norwood, Mass.) is utilized to peel the film construction at 90 degrees from the panel at a rate of 500 inches per minute (13 m/min). Three samples of 1 inch by 5 inch (2.5 cm×12.7 cm) for each hybrid solvent barrier/primer layer were evaluated. The evaluation is performed at the bonded site excluding the initial quarter inch (0.64 cm) and examined over the next one inch (2.5 cm) (i.e., from one-quarter to one-and-a-quarter inches; 0.64 cm-3.14 cm). In none of the samples did the vinyl delaminate from the hybrid solvent barrier/primer layer or did the hybrid solvent barrier/primer layer split, resulting in passing evaluations. Results are shown in Table 2.

TABLE 2

| Permeation Rate and Ply Failure for E1-E12 and CE1-CE9. | | | | |
|---|---|---|---|---|
| Example Number | Resin Blend | % co-Resin | Permeation Rate (% solvent loss/hour) | Ply Failure |
| CE1 | Ultramid 1C:HX 2592T | 20:80 | 1.66 | pass |
| CE2 | Ultramid 1C:HX 2592T | 30:70 | 1.49 | pass |
| CE3 | Ultramid 1C:HX 2592T | 40:60 | 1.38 | pass |
| E1 | Ultramid 1C:HX 2592T | 50:50 | 0.98 | pass |
| E2 | Ultramid 1C:HX 2592T | 60:40 | 0.14 | pass |
| E3 | Ultramid 1C:HX 2592T | 70:30 | 0.11 | pass |
| E4 | Ultramid 1C:HX 2592T | 80:20 | 0.10 | pass |
| CE4 | Elvamide 8063:HX 2592T | 20:80 | 1.68 | pass |
| CE5 | Elvamide 8063:HX 2592T | 30:70 | 1.65 | pass |
| CE6 | Elvamide 8063:HX 2592T | 40:60 | 1.69 | pass |
| E5 | Elvamide 8063:HX 2592T | 50:50 | 1.43 | pass |
| E6 | Elvamide 8063:HX 2592T | 60:40 | 0.83 | pass |
| E7 | Elvamide 8063:HX 2592T | 70:30 | 0.26 | pass |
| E8 | Elvamide 8063:HX 2592T | 80:20 | 0.15 | pass |
| CE7 | Ultramid 1C:M 1276 | 20:80 | 1.75 | pass |
| CE8 | Ultramid 1C:M 1276 | 30:70 | 1.68 | pass |
| CE9 | Ultramid 1C:M 1276 | 40:60 | 1.64 | pass |
| E9 | Ultramid 1C:M 1276 | 50:50 | 1.58 | pass |
| E10 | Ultramid 1C:M 1276 | 60:40 | 1.45 | pass |
| E11 | Ultramid 1C:M 1276 | 70:30 | 0.35 | pass |
| E12 | Ultramid 1C:M 1276 | 80:20 | 0.10 | pass |

Examples (E13-E26) Permeation Performance and Thickness of Hybrid Solvent Barrier/Primer Layer—Gravure Coated Vinyl Film All films for Examples E13-E26 were gravure coated at 12-inch (30.5 cm) widths using a module manufactured by Hirano Tecseed Co. Ltd, Japan. Gravure cylinders used are described in Table 3 below.

TABLE 3

| Geometry | LPI | BCM | Approx. Wet Thickness (μm) |
|---|---|---|---|
| 60° Quadrangular | 165 | 9 | 7 |
| | 170 | 14 | 10 |

TABLE 3-continued

| Geometry | LPI | BCM | Approx. Wet Thickness (μm) |
|---|---|---|---|
| Quadrangular | 120 | 24 | 18 |
| Trihelical | 80 | 36 | 27 |

Additional cast vinyl substrates were created using the process described above for Examples E1-E12. As shown in Table 4 below, vinyl film substrates were coated using different cylinders in either forward or reverse directions. All coatings were oven dried at 121° C. for 25 seconds. Permeation rate (% solvent loss/hour) was measured for each film using the Permeation—Gravimetric Cup Test described above. A scanning electron microscope (JEOL JSM-7001F Field Emission Scanning Electron Microscope, Peabody, Mass.) was used to determine thickness of the hybrid solvent barrier/primer layer. Sample preparation was done by immersing films in liquid nitrogen and fracturing them to reveal a cross section view of the hybrid solvent barrier/primer layer. At least two locations were sampled for measurements and average thickness values are shown in Table 4. In Table 4 note that CB 1 and CB 1/2 were a carbon black dispersion Hostajet Black O-PT containing solutions at concentrations of about 5% and 2.5% respectively.

TABLE 4

| Example # | Cylinder BCM | Gravure Coating Direction | Composition (Ultramid 1C/HX 2592T) | Pigment | % solvent loss/hour | SEM Thickness (micrometer) |
|---|---|---|---|---|---|---|
| E13 | 24 | Reverse | 80/20 | None | 0.23 | 0.99 |
| E14 | 24 | Forward | 80/20 | None | 0.21 | 1.26 |
| E15 | 14 | Reverse | 80/20 | None | 0.28 | 0.80 |
| E16 | 14 | Forward | 80/20 | None | 0.26 | 0.91 |
| E17 | 9 | Reverse | 80/20 | None | 0.27 | 0.63 |
| E18 | 9 | Forward | 80/20 | None | 0.27 | 0.71 |
| E19 | 9 | Reverse | 70/30 | None | 0.83 | 0.60 |
| E20 | 9 | Forward | 70/30 | None | 0.77 | 0.67 |
| E21 | 24 | Reverse | 70/30 | CB 1 | 0.84 | 0.71 |
| E22 | 24 | Reverse | 70/30 | CB 1/2 | 0.72 | 0.95 |
| E23 | 24 | Reverse | 80/20 | CB 1 | 0.61 | 0.83 |
| E24 | 24 | Reverse | 80/20 | CB 1/2 | 0.59 | 0.85 |
| E25 | 9 | Forward | 80/20 | CB 1 | 0.91 | 0.60 |
| E26 | 9 | Reverse | 80/20 | CB 1 | 0.72 | 0.62 |

Examples E27-E30 and Comparative Examples CE10-CE12 Permeation Testing of Hybrid Solvent Barrier/Primer Layer—Gravure Coated Vinyl Film Using FTIR/ATR Spectroscopy Fourier Transform Infrared spectroscopy (FTIR) equipped with an attenuated total reflection (ATR) crystal sampling device was used to characterize the amount of solvent from an ink coated onto an adhesive coated vinyl print film that migrates through an intermediate hybrid solvent barrier/primer layer into the adhesive layer. Roland ECO-SOL MAX2 ESL4-4BK black ink was coated onto an adhesive laminated vinyl print film using a #15 Mayer Rod, targeting 1.25 to 1.5 mils wet which corresponds to 250-300% ink coverage (% fill). The ink coated film was placed on a hot plate at 52° C. for 2.5 minutes, simulating the drying step of a typical inkjet printing process. The release liner was then removed from the adhesive and the adhesive side of the film is applied to the ATR crystal.

For quantitative analysis, a calibration curve was first developed by preparing different ratios of ink in the pressure sensitive adhesive and tracking specific wavenumbers (1778 cm$^{-1}$ relative to 1731 cm$^{-1}$) to calibrate peak heights to solvent weight percent composition. This calibration curve was then used to quantify the overall solvent weight percentage at the surface of the adhesive in printed commercially available print film (IJ180Cv3-10, available from 3M Company; St. Paul., Minn.) and the hybrid solvent barrier/primer layer-coated films. A Nicolet iS10 Fourier transform infrared spectrometer (FTIR) (Thermo Fisher, 168 Third Avenue, Waltham, Mass.) equipped with a zinc selenide (ZnSe) multi-bounce attenuated total reflection (ATR) crystal was used to characterize the dynamics of solvent migration from a graphic film surface, through the film, across a barrier coating into the adhesive as a function of time.

Total solvent ink concentration data (wt %) at the adhesive surface for commercially available printed vinyl film (IJ180Cv3-10, 2 mil PVC Film) (no barrier) and 10% wt/wt solution hybrid solvent barrier/primer-coated graphic films varying in blend composition and thickness are shown in Tables 5a and 5b. Gravure cylinder BCM values used to coat hybrid solvent barrier/primer layer solutions are shown in parentheses. The same process were used to generate Examples CE10-CE12 and E27-E30 as used for E13-E26. Examples labeled 1-layer or 2-layer denote either an initial single layer coated onto the film and a second layer coated, respectively. Negative values are due to instrument noise at low signal-to-noise data points.

TABLE 5a

| | CE10 2 mil PVC | | CE11 100% HX- | | CE12 100% HX- |
|---|---|---|---|---|---|
| Time (min) | Film (no barrier layer) | Time (min) | 2592 (36 bcm) (1-layer) | Time (min) | 2592 (36 BCM) (2-layer) |
| 0 | −0.0085 | 0 | −0.0085 | 0 | −0.0085 |
| 4 | 5.2404 | 8 | 3.4060 | 4 | −2.0697 |
| 6 | 6.4550 | 9 | 2.7585 | 8 | −0.0720 |
| 8 | 6.9801 | 10 | 3.5259 | 10 | −0.7724 |
| 10 | 7.2570 | 16 | 3.9018 | 14 | −0.4771 |
| 12 | 8.2786 | 21 | 5.0903 | 16 | 0.4318 |
| 14 | 8.9584 | 26 | 6.4495 | 20 | 0.4492 |
| 16 | 9.1794 | 30 | 6.1333 | 24 | 1.2729 |
| 21 | 9.3682 | 40 | 6.3932 | 30 | 1.7974 |
| 26 | 8.7313 | 50 | 6.3128 | 34 | 2.1586 |
| 37 | 8.0947 | 60 | 5.9293 | 39 | 2.1620 |
| 49 | 7.1206 | 70 | 5.7368 | 44 | 1.9211 |
| 82 | 6.0024 | 80 | 5.7566 | 49 | 2.2631 |
| 116 | 4.0520 | 90 | 4.9358 | 54 | 1.9032 |
| 146 | 4.2255 | 110 | 5.3959 | 59 | 2.3936 |
| 178 | 3.1441 | 120 | 4.9279 | 64 | 2.9369 |

TABLE 5a-continued

| Time (min) | CE10 2 mil PVC Film (no barrier layer) | Time (min) | CE11 100% HX-2592 (36 bcm) (1-layer) | Time (min) | CE12 100% HX-2592 (36 BCM) (2-layer) |
|---|---|---|---|---|---|
| 237 | 3.0563 | | | | |
| 267 | 2.6048 | | | | |
| 287 | 3.7730 | | | 69 | 2.7123 |
| | | | | 74 | 2.2810 |
| | | | | 79 | 2.1806 |
| | | | | 84 | 2.4056 |
| | | | | 89 | 2.2930 |
| | | | | 127 | 2.4378 |
| | | | | 159 | 2.8826 |
| | | | | 219 | 2.4070 |
| | | | | 262 | 2.4893 |
| | | | | 285 | 2.1868 |
| | | | | 305 | 2.4307 |
| | | | | 335 | 2.1108 |
| | | | | 1530 | 0.4300 |

TABLE 5b

| Time (min) | E27 50/50 HX-2592/U1C (36 BCM) (1-layer) | Time (min) | E28 50/50 HX-2592/U1C (36 BCM) (2-layer) | Time (min) | E29 30/70 HX-2592/U1C (14 BCM) (1-layer) | Time (min) | E30 30/70 HX-2592/U1C (24 BCM) (1-layer) |
|---|---|---|---|---|---|---|---|
| 0 | −0.0085 | 0 | −0.0085 | 0 | −0.0085 | 0 | −0.0085 |
| 8 | 0.7881 | 5 | −0.5504 | 6 | 0.0809 | 5 | 0.1350 |
| 10 | 1.7314 | 10 | 0.2413 | 9 | −0.3283 | 7 | −0.0816 |
| 12 | 1.8750 | 12 | 0.5828 | 12 | −0.1996 | 10 | 0.1232 |
| 20 | 0.5718 | 15 | 0.3422 | 16 | −0.2372 | 15 | −0.3088 |
| 21 | 1.8686 | 20 | 0.2086 | 19 | 0.7436 | 20 | −0.5576 |
| 23 | 1.8457 | 25 | 1.2050 | 22 | 2.4645 | 25 | −0.7959 |
| 25 | 2.9506 | 30 | 1.3292 | 29 | 1.6604 | 27 | 0.0049 |
| 27 | 2.4430 | 36 | 1.1773 | 34 | 2.3735 | 30 | 0.3803 |
| 28 | 2.7498 | 41 | 0.9459 | 36 | 2.3590 | 35 | 0.4993 |
| 30 | 2.4643 | 50 | 1.2750 | 40 | 1.3429 | 45 | −0.0868 |
| 35 | 2.3778 | 55 | 0.5233 | 42 | 2.3156 | 55 | 1.2026 |
| 40 | 2.4989 | 60 | 0.9344 | 46 | 1.1959 | 65 | 0.3912 |
| 45 | 3.2598 | 65 | 0.2597 | 50 | 1.6277 | 75 | −0.0328 |
| 50 | 2.7823 | 80 | 0.6454 | 55 | 1.7467 | 85 | 0.2290 |
| 60 | 2.4018 | 85 | 0.4008 | 60 | 1.9391 | 96 | 0.3140 |
| 70 | 2.4930 | 102 | 1.3745 | 67 | 1.3019 | 106 | 0.7254 |
| 80 | 2.4490 | 115 | 0.8820 | 70 | 0.7900 | 125 | −0.2369 |
| 100 | 2.7023 | 137 | 0.2810 | 80 | 1.6522 | 148 | 0.3042 |
| 120 | 2.1920 | 150 | 1.3005 | 90 | 2.0779 | 165 | −0.1639 |
| 147 | 2.0743 | 180 | 0.9393 | 100 | 1.3154 | 186 | −0.9366 |
| 193 | 2.8009 | 215 | 0.9963 | 110 | 2.1651 | 206 | −0.3250 |
| 220 | 2.0081 | 245 | 0.2668 | 120 | 1.8571 | 245 | −0.1921 |
| 266 | 2.1460 | 290 | 0.9324 | | | 307 | −0.2008 |
| 280 | 1.6609 | 314 | 1.0788 | | | 400 | 0.4915 |
| 300 | 1.9793 | 1380 | 0.3386 | | | | |
| 330 | 1.8621 | | | | | | |
| 1560 | 0.4105 | | | | | | |

Examples E31-E36 Gravimetric Cup Permeation Performance (% Solvent Loss/Hour) on Manufacturing Scale Vinyl Film and Coating Thickness (Micrometers) Measured Using Scanning Electron Microscopy Vinyl films labeled "A" were formed as described above for Examples E1-E12. Vinyl films labeled "B" were formed as described above for Examples E1-E12, except that they also included an acrylic resin and a light stabilizer and were cast on a polyester casting liner. Vinyl films labeled "C" were formed as described above for Examples E1-E12, except that they also included a polyester resin in the cast organosol.

Vinyl film substrates were gravure coated using 10 wt % solution at 70/30 Ultramid 1C/HX 2592 solution. Coatings were made using either reverse or forward gravure direction using either a 21.2 or 9.6 BCM gravure cylinder. Oven drying conditions were as follows: E31 dried at 135° C. for 32 seconds; E32 dried at 135° C. for 16 seconds, 93° C. for 8 seconds, and 66° C. for 8 seconds; E33 dried at 135° C. for 25 seconds, 93° C. for 8 seconds, and 66° C. for 8 seconds; E34 dried at 135° C. for 41 seconds; E35 dried at 135° C. for 41 seconds; and E36 dried at 135° C. for 41 seconds. Permeation was determined using the previous described Gravimetric Cup Test. Thickness measurement was determined using scanning electron microscopy, sample preparation, and averaging previously described. Permeation and thickness results are shown in Table 6.

TABLE 6

| Example # | Vinyl Film | Gravure Cylinder BCM | Cylinder Lines | Gravure Direction | Permeation (% solvent loss/hour) | SEM Thickness (micrometer) Mean |
|---|---|---|---|---|---|---|
| E31 | A | 21.2 | 65 | Forward | 0.43 | 1.15 |
| E32 | B | 21.2 | 65 | Forward | 0.38 | 1.07 |
| E33 | B | 21.2 | 65 | Reverse | 0.41 | 0.98 |
| E34 | A | 21.2 | 65 | Reverse | 0.47 | 1.06 |
| E35 | C | 21.2 | 65 | Reverse | 0.40 | 0.99 |
| E36 | A | 9.6 | 150 | Reverse | 0.74 | 0.55 |

What is claimed is:

1. A conformable, stretchable printable film consisting of:
a film substrate having a first major surface for receiving ink;
a pressure sensitive adhesive; and
a hybrid solvent barrier/primer layer or stack, wherein the hybrid solvent barrier/primer layer or stack is disposed between the film substrate and the pressure sensitive adhesive,
and is disposed on the opposite side of the film substrate from the first major surface;
wherein the hybrid solvent barrier/primer layer or stack is a single layer or a layer stack, and wherein the hybrid solvent barrier/primer layer or stack is a resin blend comprising two copolyamides that are not miscible; and
wherein the hybrid solvent barrier/primer layer or stack includes one copolyamide in a continuous and one copolyamide in a discontinuous phase, wherein the hybrid solvent barrier/primer layer or stack bonds to both the film substrate and the pressure sensitive adhesive layer.

2. The film of claim 1, wherein the two copolyamides includes a copolyamide with a tertiary amide functional group and a copolyamide without a tertiary amide functional group.

3. The film of claim 2, wherein the copolyamide with a tertiary amide functional group is no more than 50 wt % of the two copolyamides.

4. The film of claim 2, wherein the copolyamide with a tertiary amide functional group is no more than 40 wt % of the two copolyamides.

5. The film of claim 1, wherein the hybrid solvent barrier/primer layer or stack is 5 micrometers or thinner.

6. The film of claim 1, wherein the hybrid solvent barrier/primer layer or stack is 1 micrometer or thinner.

7. The film of claim 1, wherein the two copolyamides of the hybrid solvent barrier/primer layer or stack dissolve in a mixture of n-propanol and water.

8. The film of claim 1, wherein the two copolyamides of the hybrid solvent barrier/primer layer or stack dissolve in a polar solvent.

9. The film of claim 1, wherein the two copolyamides of the hybrid solvent barrier/primer layer or stack are coextrudable.

10. The film of claim 1, wherein the hybrid solvent barrier/primer layer or stack includes a pigment.

11. The film of claim 1, wherein the film substrate includes polyvinyl chloride.

12. The film of claim 1, wherein the film substrate includes polyurethane.

13. The film of claim 1, wherein the hybrid solvent barrier/primer layer or stack comprises a two-layer stack such that a first layer of hybrid solvent barrier/primer layer is bonded to the film substrate, and a second layer of hybrid solvent barrier/primer layer is bonded to the first hybrid solvent barrier/primer layer and to the pressure sensitive adhesive layer.

14. The film of claim 13, wherein the first hybrid solvent barrier/primer layer includes an aminoethylated acrylic polymer.

15. The film of claim 13, the first hybrid solvent barrier/primer layer includes crosslinked acrylic acrylate-amine copolymers.

16. The film of claim 13, wherein the first hybrid solvent barrier/primer layer includes a pigment.

17. A conformable, stretchable, printable film consisting of:
a film substrate having a first major surface for receiving ink;
a pressure sensitive adhesive; and
a hybrid solvent barrier/primer stack, wherein the hybrid solvent barrier/primer stack is disposed between and bonds to both the film substrate and the pressure sensitive adhesive, and is disposed on the opposite side of the film substrate from the first major surface;
wherein the hybrid solvent barrier/primer stack includes two layers;
wherein each of the layers in the hybrid solvent barrier/primer stack is a resin blend comprising two copolyamides that are not miscible; and
wherein each of the layers in the hybrid solvent barrier/primer stack includes a different blend of the two same copolyamides.

* * * * *